United States Patent [19]

Dowd

[11] 4,090,852
[45] May 23, 1978

[54] GAS FLOW PERVIOUS SUPPORT AND RETAINING STRUCTURE FOR PARTICULATE MATERIAL

[75] Inventor: Edward J. Dowd, Palatine, Ill.
[73] Assignee: Air Resources, Inc., Palatine, Ill.
[21] Appl. No.: 754,020
[22] Filed: Dec. 23, 1976
[51] Int. Cl.² .............................................. B01J 8/44
[52] U.S. Cl. .................................. 23/288 F; 23/284;
 23/288 S; 34/10; 34/57 A; 110/8;110/218;
 110/263; 423/Dig 16
[58] Field of Search ................... 23/284, 288 S, 288 F;
 34/10, 57 A; 423/459 F; 110/8 F; 432/15, 58

[56] References Cited

U.S. PATENT DOCUMENTS

| 2,614,034 | 10/1952 | Brummerstedt ..................... 23/288 S |
| 2,715,565 | 8/1955 | McKay ............................... 432/58 X |
| 3,002,805 | 10/1961 | Browning, Jr. et al. ............ 34/10 X |

FOREIGN PATENT DOCUMENTS

| 41,882 | 1966 | Japan ................................. 23/288 S |

*Primary Examiner*—Morris O. Wolk
*Assistant Examiner*—Roger F. Phillips
*Attorney, Agent, or Firm*—Merriam, Marshall & Bicknell

[57] ABSTRACT

A structure is provided for supporting and retaining bed of particulate material, such as a catalyst, in a reactor or the like, so that the material is prevented from falling through the structure when the material is in either a fluidized or agitated condition due to an upward flow of gas through the structure and material or when the material is quiescent. The support and retaining structure also provides a uniformly distributed gas flow through the material supported thereon and includes a first set of elongated, channel-shaped retaining members arranged in parallel, laterally spaced relation with the flanges of the channels extending upwardly and with elongated gaps between the flanges. A second set of elongated, inverted channel-shaped retaining members are also arranged in parallel, laterally spaced relation with their flanges extending downwardly and with elongated gaps between the flanges. The second set of retaining members are positioned above the first set of retaining members in staggered relation so as to overlie the gaps between the first set of retaining members. The flanges of the second set of retaining members overlap the flanges of the first set of retaining members to prevent particulate material from falling through the gaps between the first set of retaining members. Spacers maintain the first and second sets of retaining members in a predetermined position and clips on the second set of retaining members extend downwardly in and toward the ends of the gaps between the first set of retaining members to prevent particulate material from falling through the gaps at the ends thereof.

3 Claims, 6 Drawing Figures

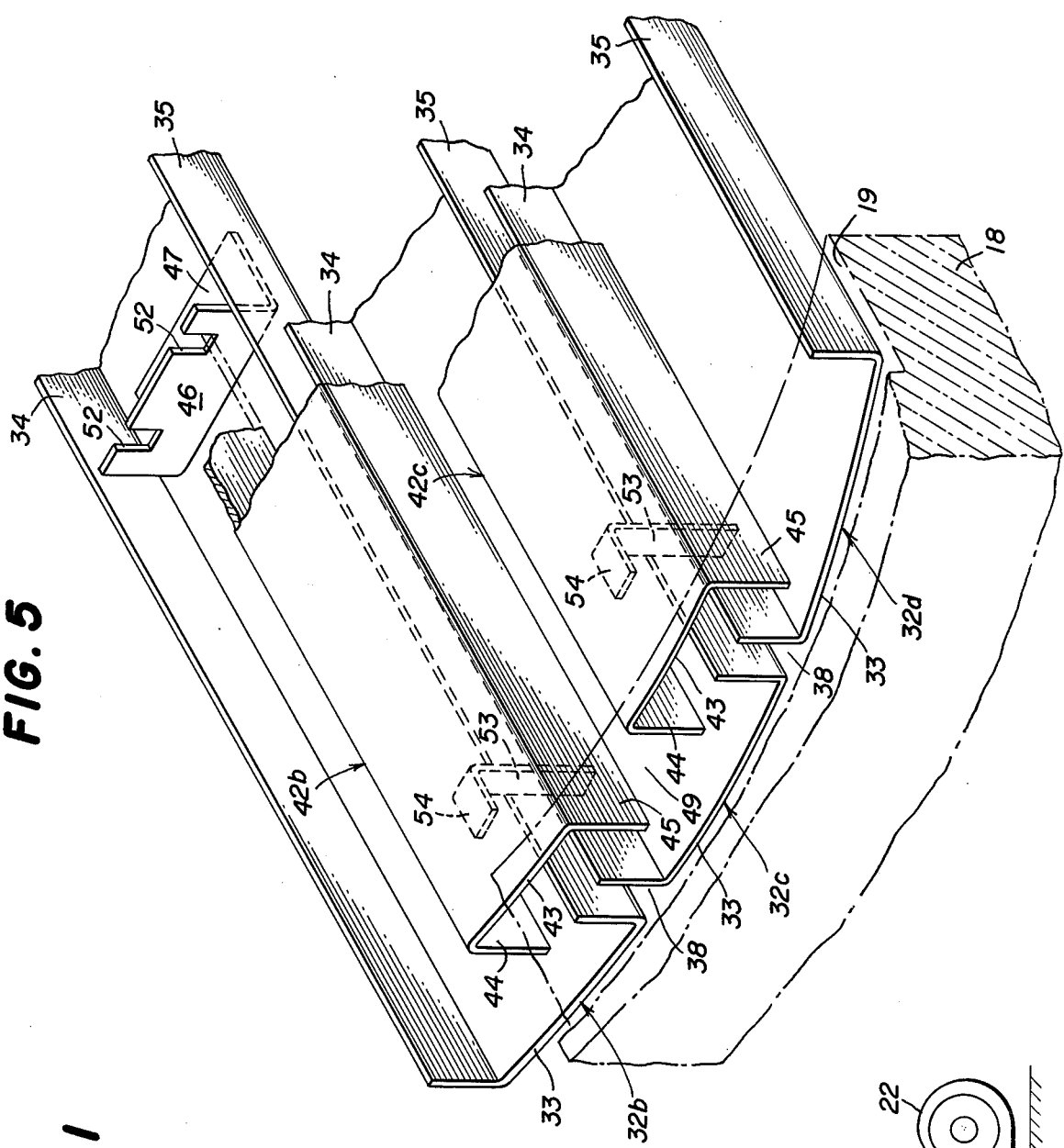
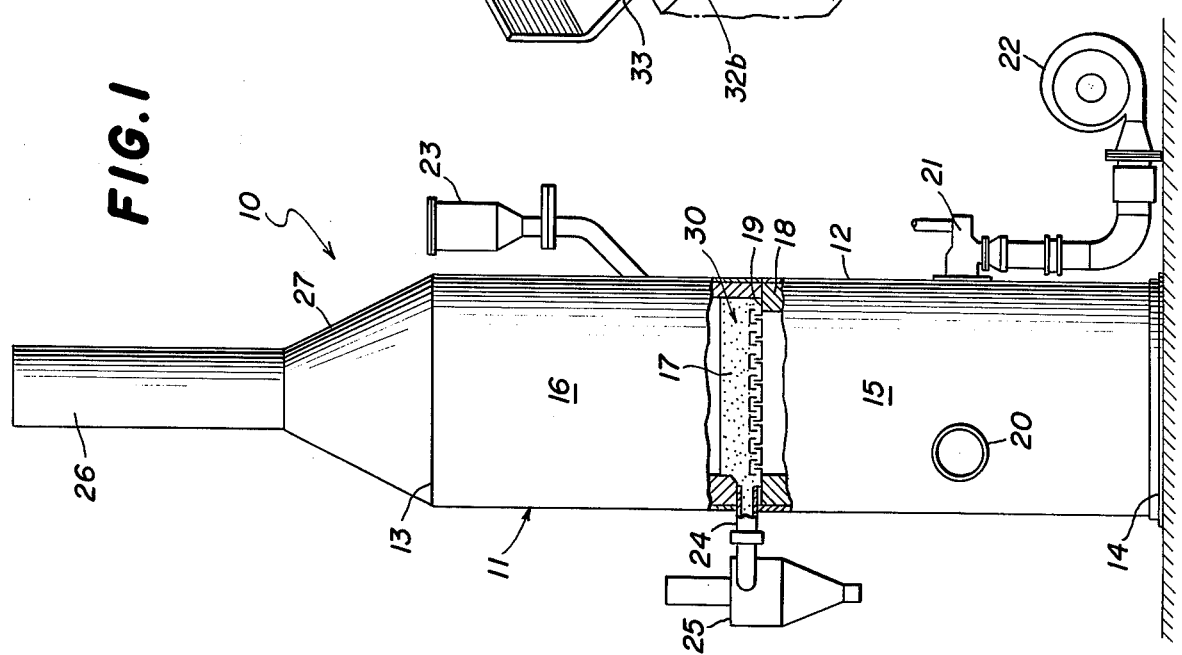

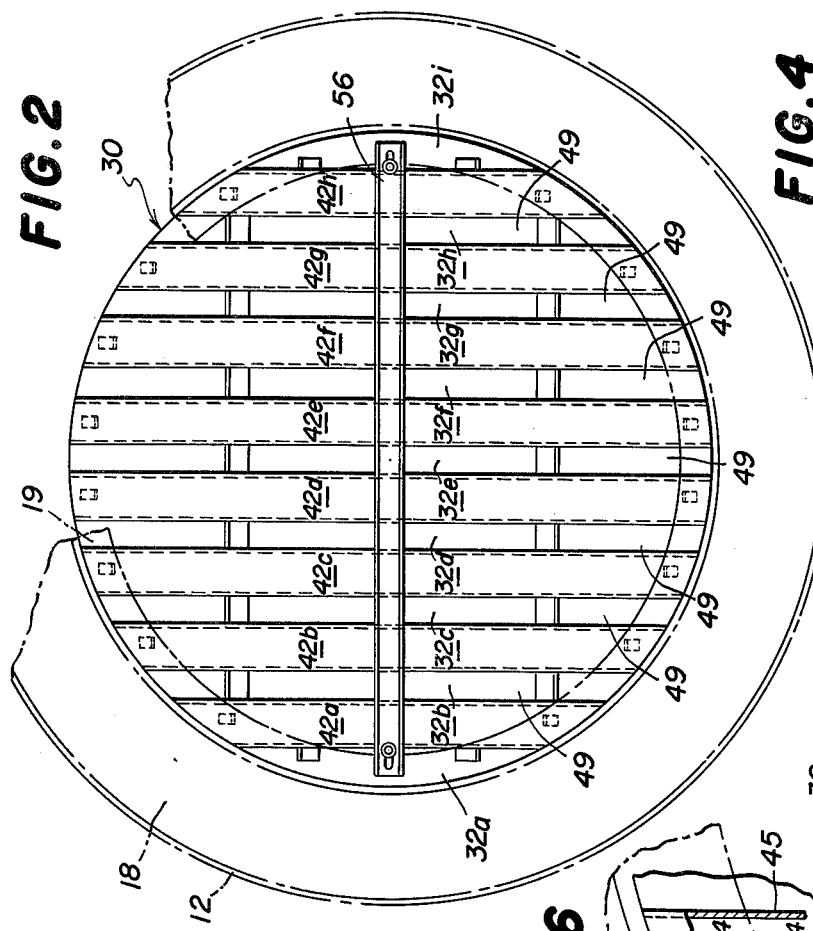
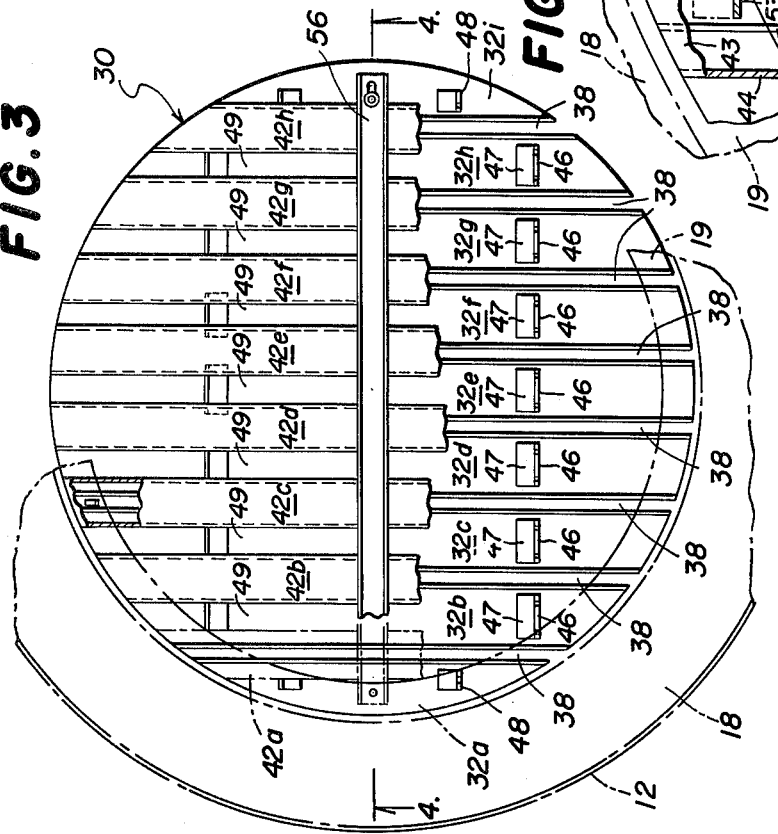
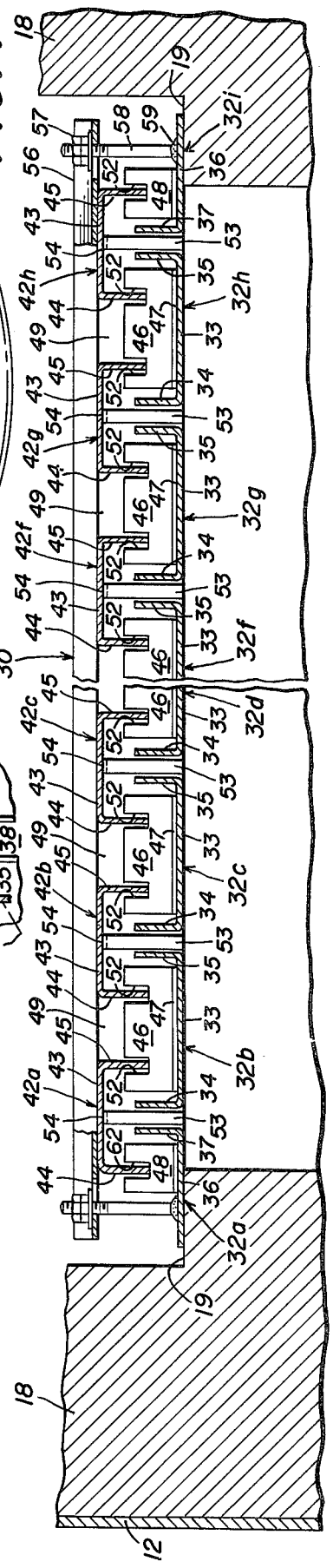

GAS FLOW PERVIOUS SUPPORT AND RETAINING STRUCTURE FOR PARTICULATE MATERIAL

This invention relates to a gas flow pervious retaining structure for supporting particulate material, and more particularly relates to a combined support and gas flow distributing structure or grid for supporting particulate catalytic material in a reactor and for uniformly distributing gas through the catalyst.

Various types of structures have been developed for supporting solid, particulate, catalytic material in a reactor, which prevent the material from falling through the structure either when gas is flowing upwardly therethrough to fluidize or agitate the material or when the material is quiescent. While many of the particulate material support and retaining structures heretofore advanced have proved generally satisfactory for their intended purpose, others have not for various reasons such as excessive loss of material through the structure when the material is in either a fluidized, agitated or quiescent condition, loss of catalyst efficiency due to inability to obtain adequate distribution of the gas flow through the catalytic material when the latter is fluidized, undesirably large drops in the pressure of the gas flowing through the structure, and insufficient compensation for thermal expansion of the elements of the structure when the latter is subject to high operating temperatures.

Accordingly, it is a general object of the present invention to provide a novel and improved support and retaining structure for particulate material, which is not subject to the foregoing objections and disadvantages.

A more particular object is to provide a novel support and gas distribution structure for supporting a bed of solid, particulate catalytic material in a reactor, which prevents any substantial amount of the catalyst from falling through the support structure and which provides a uniformly distributed flow of gas through the catalyst when the latter is in either a fluidized, agitated or quiescent condition.

Another object is to provide a novel catalyst support and retaining structure of the character described, which is simple in construction, reliable and efficient in operation, and economical to manufacture and maintain.

These and other objects will become apparent from the following detailed description and accompanying sheets of drawings, in which:

FIG. 1 is an elevational view, with a portion thereof broken away to show internal details, of a reactor employing a structure embodying the features of the present invention for supporting and retaining a bed of solid, particulate, catalytic material in the reactor;

FIG. 2 is a plan view, on a reduced scale, of the particulate material retaining and support structure of the present invention and showing the relationship of the latter when mounted in the reactor illustrated in FIG. 1, the structure of the reactor being shown in phantom lines;

FIG. 3 is a view similar to FIG. 2 but with portions of the retaining and support structure broken away to show underlying structural details;

FIG. 4 is an enlarged, broken, cross sectional view taken substantially along the line 4—4 of FIG. 3;

FIG. 5 is an enlarged, fragmentary perspective view of a portion along the outer periphery of the support and retaining structure of the invention in relation to a supporting shoulder on the side wall of the reactor, portions of the support and retaining structure being broken away to show additional structural details thereof; and FIG. 6 is a fragmentary plan view, with some parts in section and others broken away to show underlying structure, of a portion along the outer periphery of the particulate support and retaining structure of the invention.

In FIG. 1, an apparatus, indicated generally at 10, is illustrated for treating industrial fumes and waste gases containing combustible noxious materials by catalytic incineration. The apparatus 10 includes an elongated, vertically extending reactor 11 having an external housing 12 which, in the present instance, is circular in cross section. The housing 12 has an upper end 13 and a lower end 14 and is divided into a lower, preheat zone 15 and an upper, catalyst zone 16 located above a bed of particulate catalytic material, indicated at 17. The catalyst bed 17 is supported in the housing 12 by a support and retaining structure embodying the features of the present invention and indicated generally at 30.

The interior of the reactor housing 12, in the present instance, is lined with a heat resistant refractory material 18, the wall thickness of which is reduced in the upper catalyst portion 16 to define a shoulder or ledge 19 for supporting the support and retaining structure 30. The details of the construction and operation of the support and retaining structure 30 will be described more fully hereinafter.

An inlet 20 for industrial fumes or waste gases to be treated is provided in the lower portion of the housing 12, the inlet 20 communicating with the preheat zone 15. A burner 21 supplies hot combustion gases to the preheat zone 15, the hot combustion gases mixing in the preheat zone with the industrial fumes and/or waste gases entering the zone 15 from the inlet 20. A blower 22 and a source of fuel (not shown) supply fuel and air under pressure to the burner 21. An external hopper 23, containing a quantity of particulate catalytic material, serves to replenish the bed 17, when needed. Spent catalyst is removed from the bottom of the bed 17 through a pipe 24 which communicates with a cyclone separator 25. Pollutant-free effluent gases in the zone 16 of the reactor are discharged to the atmosphere, or elsewhere, through a stack 26 after passing through an intermediate conical transition section 27 connected to the upper end 13 of the housing 12.

A more detailed description of the construction and operation of the apparatus 10 and reactor 11 will be found in the now pending Hunter et al U.S. patent application Ser. No. 731,987, filed Oct. 13, 1976 and assigned to the assignee of this application.

Referring now to FIGS. 2-6, inclusive, in conjunction with FIG. 1, it will be seen that the support and retaining structure 30 of the present invention comprises a first set of elongated retaining members, indicated at 32a-32i, respectively, having a length such as to span the interior of the housing 12 and so that the outer ends of the members 32a-32i rest upon the ledge 19. Each of the retaining members 32b-32h is preferably in the form of a channel having a plate portion or web 33 and a pair of spaced flange portions 34 and 35 which extend perpendicular to the web 33 from the side edges thereof. Each of the end retaining members 32a and 32i likewise has a plate portion or web 36 but only a single flange portion, indicated at 37, along one side edge thereof.

The retaining members 32a–32i are laterally spaced from each other so as to define gaps 38 (FIG. 3) therebetween to permit gas to flow upwardly through the gaps 38 and ultimately through the catalyst bed 17 to fluidize or agitate the same when the reactor 11 is in operation.

The support and retaining structure 30 also includes a second set of elongated, retaining members, indicated at 42a–42h. The retaining members 42a–42h are similar to the retaining members 32b–32h in that the members 42a–42h each has a plate portion or web 43 and a pair of spaced flange portions 44 and 45, which extend perpendicular to the webs 43 at the lateral side edges thereof. The retaining members 42a–42h are thus preferably in the form of inverted channels and are arranged with their webs 43 extending horizontally and their flanges 44 and 45 extending downwardly. The second set of retaining members 42a–42h are laterally spaced from each other to define elongated gaps 49 therebetween through which gases under pressure may flow when the reactor 11 is in operation.

As will be apparent from FIGS. 2, 3 and 4, the second set of retainer members 42a–42h are positioned in superimposed, horizontally staggered relation with respect to the first set of retaining members 32a–32i so that the webs 43 of the members 42a–42h are substantially centered over the gaps 38 between the first set of retaining members 32a–32i. In addition, the webs 43 of the second set of retaining members 42a–42h are located in a predetermined elevated or vertically spaced position with respect to the webs 33 and 36 of the first set of retaining members 32a–32i so that the flanges 44 and 45 of the retaining members 42a–42h vertically overlap the flanges 34, 35 and 37 of the first set of retaining members 32a–32i. The flanges 34, 35, and 37 of the first set of retaining members 32a–32i and the flanges 44 and 45 of the second set of retaining members 42a–42h thus comprise baffle means for preventing particulate material resting on the suppot and retaining structure 30 from flowing laterally into and downwardly through the gaps 38 between the retaining members 32a–32i either when the reactor 11 is inoperative or when the reactor is operative and gases are flowing upwardly through the structure 30 to fluidize or agitate the catalyst bed 17.

In order to maintain the second set of retaining members 42a–42h in the aforementioned horizontally staggered and vertically spaced positions with respect to the first set of retaining members 32a–32i, spacer means is provided. Such spacer means comprises at least one and preferably a pair of longitudinally spaced spacer members mounted on the upper surface of the web 33 of each of the retaining members 32b–32h and at least one and preferably a pair of longitudinally spaced spacer members mounted on the upper surface of the web 36 of the retaining members 32a and 32i, the spacer members extending upwardly therefrom. In the present instance, the spacer members that are mounted on the retaining members 32b–32h are preferably in the form of an angle having an upstanding plate portion 46 and a horizontally extending flange portion 47 which may be secured to the webs 33 as by tack welding the flange portions thereof. Since only the flange 44 of the retaining member 42a and the flange 45 of the retaining member 42h overlap the webs 36 of the retainer members 32a and 32i, the plate portions, indicated at 48, of the spacer members that are mounted on the webs 36 of the retaining members 32a and 32i are of lesser width than the plate portions 46 of the other spacer members.

In order to prevent the retaining members 42a–42h from shifting horizontally to any substantial extent relative to the retaining members 32a–32i, recesses or slots 52 are provided in the upper edge portions of the plate portions 46 and 48 of the spacer members for receiving the flanges 44 and 45 of the retaining members 42a–42h. Thus, the horizontal position and depth of the slots 52 in the plate portions 46 of the spacer members is such as to maintain the desired staggered relationship between the retaining members 32a–32i and 42a–42h as well as the desired vertical spacing between the webs 33, 36 and 43 and the desired overlap of the flanges of the retaining members.

As best seen in FIG. 4, the width of the slots 52 in the spacer members 46 and 48 is greater than the thickness of the flanges 44–45 of the retaining members 42a–42h by an amount sufficient to accommodate expansion of the retaining members 32a–32i and 42a–42h when the support and retaining structure 30 heats up. For example, if the operating temperature range in the reactor 11 is between 70° F and 1500° F, the retaining members 42a–42h may be formed from 14 gauge, heat resistant alloy steel material, e.g. Hastelloy "B", having a web width of 2½ inches and a flange length of 1¼ inches, and the width of the slots 52 may be about ¼ inch.

In order to prevent particulate material supported on the structure 30 from migrating around the ends of the retaining members 32a–32i and falling through the gaps 38 into the preheat zone 15, partition means is provided in the gaps 38 between the retaining members 32a–32i. Such partition means preferably comprises a plurality of elongated plate members or clips 53 secured to the undersides of the webs 43 of the retaining members 42a–42h so as to depend vertically downwardly therefrom and transversely across the gaps 38. To this end, the upper end of each clip 53 may be provided with a flange 54 which is bent at a right angle to the clip and which may be secured, as by tack welding, to the underside of the web 43 of its respective retaining member.

Each clip 53 has a length substantially equal to the distance between the undersurface of the webs 43 of the retaining members 42a–42h and the undersurfaces of the webs 36 of the retaining members 32a–32i. In addition, the clips 53 are positioned toward the outer ends of the retaining members 42a–42h so that the lower ends of the clips 53 engage or are positioned closely adjacent the ledge 19 on the refractory material lining 18. This relationship is best seen in FIGS. 2, 5 and 6. Consequently, the clips 53 also serve to support the outer ends of the retaining members 42a–42h and maintain the desired vertical spacing between the retaining members 42a–42h and 32a–32i. The clips 53 also facilitate alignment of the flanges 44 and 45 of the retaining members 42a–42h with the slots 52 in the plate portions 46 and 48 of the spacer members during assembly of the structure 30. In addition, the clips 53 prevent tilting of the retainer members 42a–42h both during assembly of the structure 30 and after assembly when the structure is in use.

As best seen in FIG. 6, the transverse width of the clips 53 is somewhat less than the width of the gaps 38. Consequently, some clearance is provided between the side edges of the clips and the outer sides of the flanges 34 and 35. This clearance allows for expansion of the retaining members 32a–32i and narrowing of the gaps 38 as the retaining and support structure 30 heats up.

In order to prevent the flanges 44 and 45 of the retaining members 42a-42h from lifting out of or otherwise becoming disengaged from the slots 52 in the suppot plates 46, a hold-down bar 56 (FIGS. 2, 3 and 4), may be provided. The hold-down bar 56, in the present instance, is channel-shaped and extends transversely across the retaining members 42a-42h and bears against the upper surfaces of the webs 43 thereof to hold the flanges 44 and 45 seated in the slots 52. The hold-down bar 56 is retained in clamping engagement with the retaining members 42a-42h by nuts 57 threaded onto the upper end of a pair of studs 58 respectively secured to the upper surfaces of the webs 36 of the retaining members 32a and 32i as by welding 59. In larger installations, a pair of hold-down bars may be utilized.

With the foregoing construction, it will be apparent that when the retaining and support structure 30 is mounted in a reaction apparatus, such as the reactor 11, and a quantity of solid, particulate catalyst material is poured or distributed over the support and retaining structure 30, little or none of the catalyst will fall through the gaps 38 between the flanges of the retaining members 32a-32i. In addition, since the retaining members 32a-32i and 42a-42h are channels, the structure 30 is rigid and capable of supporting the catalyst bed 17 without any additional reinforcement. Confinement of the catalyst results from the labyrinth-type seal provided at the gaps by the vertically overlapping relationship of the flanges 34 and 35 of the retaining members 32a-32i and flanges 44 and 45 of the retaining members 42a-42h.

The extent of overlap and lateral spacing between the overlapped flanges 34, 45; 35, 44 and 37, 44-45, and the vertical spacing between the upper and lower retaining members 42a-42h and 32a-32i, respectively, are selected with regard to the natural angle of repose of the particulate material so that it cannot flow upwardly over the flanges 34, 35 and 37 and through the gaps 38, either when the bed of particulate material is fluidized or agitated due to the upward flow of gas through the retaining structure 30 or when the bed is quiescent. Moreover, since the gaps 49 extend for the full length of the upper retaining members 42a-42h, a uniform distribution of the gas flow through the catalyst bed 17 is obtained, without channeling. In addition, the width of the gaps 38 and 49 is preferably chosen so that an open flow area of about 10.8% to 12.5% is obtained between the lower retaining members 32a-32i and an open flow area of about 25.5% to 35.5% is obtained between the upper retaining members 42a-42h. With these ranges of flow areas, the support and retaining structure 30 will accommodate a superficial linear velocity gas flow range of between about 1 to 4000 feet per minute.

The clips 53 at the ends of the gaps 38 act as partitions and contribute to the retention of particulate material on the structure 30 by preventing migration of the material around the ends of the retaining members 32a-32i and then inwardly into the gaps 38. The clips 53 also facilitate alignment of the upper retaining members 42a-42h with the lower retaining members 32a-32i and prevent tilting of the upper retaining members 42a-42h when gas is flowing upwardly through the structure 30, as previously described.

It should be understood that while the support and retaining structure 30 of the present invention has been herein described as a gas flow pervious support for retaining a bed of solid, particulate catalyst in a reactor, the structure 30 may also be used in other applications where it is necessary or desirable to support a quantity of particulate material either in a quiescent condition or so that gas can flow through the material in an evenly distributed manner without channeling. Moreover, while the support and retaining structure 30 has been herein described as being operable to support and assure a uniformly distributed gas flow through a quantity of particulate material, such as the bed of catalyst 17, the structure 30 may also be used without the presence of any catalyst as a gas distributing and mixing device to promote more efficient combustion. The undulating flow path through the gaps 38 and 49 and through the clearance between the overlapping flanges 34,45; 35,44 and 37, 44-45 of the retaining members 32a-32i and 42a-42h provides this result.

I claim:

1. A reactor for incinerating fumes and waste gases containing combustible noxious materials, said reactor comprising:

an elongated, vertically extending housing having upper and lower ends and a generally cylindrical side wall, said side wall having an inwardly extending circumferential ledge at an elevation intermediate the ends of said housing, a catalyst support structure engaging said ledge and extending across the interior of said housing to divide said housing into upper and lower zones, said catalyst support structure being adapted to receive and support a bed of particulate catalyst material in either a quiescent, agitated or fluidized state and comprising a first set of elongated channel members mounted in parallel, laterally spaced relation, the channel members of said first set having gaps therebetween and being arranged with their webs extending generally horizontally and their flanges extending upwardly from the webs, the ends of said channels resting on said ledge, a second set of elongated channel members mounted in parallel laterally spaced relation above said first set of channel members, the channel members of said second set also having gaps therebetween and being arranged with their webs extending generally horizontally and with their flanges extending downwardly from the webs, the webs of said second set of channel members being horizontally offset with respect to the webs of said first set so as to overlie the gaps between said first set of channel members, and partition means comprising a plurality of vertically elongated plate members located within the gaps between the members of said first set of channel members and adjacent the ends thereof, said plate members extending transversely across said gaps and vertically between the webs of said second set of channel members and said ledge, whereby said catalyst support structure prevents particulate catalyst from falling through the gaps between said first set of channel members either when said reactor is operating and gas under pressure is being supplied to said lower zone to fluidize or agitate said catalyst or when said reactor is inoperative or gas under pressure is not being supplied to said lower zone, said structure also serving to uniformly distribute gas through said catalyst when said reactor is operating.

2. The combination of claim 1, in which spacer means is provided for maintaining the webs of said second set of channel members in a predetermined spaced relation above the webs of said first set of channel members.

3. The combination of claim 2, in which the flanges of said second set of channel members vertically overlap the flanges of said first set of channel members.

* * * * *